US008646196B2

(12) United States Patent
Glass, Jr. et al.

(10) Patent No.: US 8,646,196 B2
(45) Date of Patent: Feb. 11, 2014

(54) SIGN ASSEMBLY

(75) Inventors: Geoffrey M. Glass, Jr., Lincolnshire, IL (US); Carol Salas, Gurnee, IL (US); Janet Riddich, legal representative, Gurnee, IL (US)

(73) Assignee: American Louver Company, Skokie, IL (US)

( * ) Notice: Subject to any disclaimer, the term of this patent is extended or adjusted under 35 U.S.C. 154(b) by 0 days.

(21) Appl. No.: 12/883,990

(22) Filed: Sep. 16, 2010

(65) Prior Publication Data
US 2012/0066946 A1    Mar. 22, 2012

(51) Int. Cl.
G09F 15/00    (2006.01)
G09F 15/02    (2006.01)

(52) U.S. Cl.
USPC ................... 40/607.03; 40/607.01; 40/608

(58) Field of Classification Search
USPC ............. 40/607.03, 608, 660, 616, 607.01, 40/606.18; 248/518, 519, 523, 158, 414, 248/127, 176.1, 220.31
See application file for complete search history.

(56) References Cited

U.S. PATENT DOCUMENTS

| | | |
|---|---|---|
| 1,505,046 A | 8/1924 | Lush |
| 1,598,438 A | 8/1926 | Hallowell |
| 1,887,894 A | 11/1932 | Schwab |
| 1,918,933 A | 7/1933 | Rogers |
| 2,064,127 A | 12/1936 | Schneider |
| 2,251,989 A * | 8/1941 | Dean .............................. 248/539 |
| 2,255,113 A | 9/1941 | Greenleaf |
| 2,388,180 A | 10/1945 | Pulver, Jr. |
| 2,454,648 A | 11/1948 | Green |
| 2,863,238 A | 12/1958 | Keech |
| 3,181,260 A * | 5/1965 | Scherotto ................... 40/607.03 |
| 3,310,901 A | 3/1967 | Sarkisian |
| 3,537,721 A | 11/1970 | Warner |
| 3,646,696 A | 3/1972 | Sarkisian |
| 3,662,482 A | 5/1972 | Sarkisian |
| 3,722,841 A * | 3/1973 | Ciolfi ............................ 248/539 |
| 4,033,536 A | 7/1977 | Hillstrom |
| 4,145,828 A | 3/1979 | Hillstrom |
| 4,280,294 A | 7/1981 | Eckberg, II |
| 4,288,053 A | 9/1981 | Sarkisian |
| 4,471,508 A | 9/1984 | Seaborg |
| 4,519,152 A | 5/1985 | Seely et al. |
| 4,548,379 A | 10/1985 | Seely et al. |
| 4,569,499 A | 2/1986 | Seely |
| 4,593,879 A | 6/1986 | Seely et al. |

(Continued)

OTHER PUBLICATIONS

International Search Report for International Application No. PCT/US2011/051594 mailed Feb. 16, 2012.

(Continued)

Primary Examiner — Joanne Silbermann
Assistant Examiner — Christopher e Veraa
(74) Attorney, Agent, or Firm — Brinks Gilson & Lione

(57) ABSTRACT

A sign assembly includes a base, a pair of spring members, and a panel. The spring members include a resilient portion that includes attachment means at a first end to enable attachment of the spring member to the base. The spring members also include a generally straight rod that extends from a second end of the resilient portion. The panel defines a pair of openings at a lower edge configured to slidably receive the rod of the spring members. The amount by which the rod slides into the panel is configured to secure the panel in an upright position.

10 Claims, 8 Drawing Sheets

(56) References Cited

U.S. PATENT DOCUMENTS

| | | |
|---|---|---|
| RE32,359 E | 2/1987 | Seely |
| 4,691,892 A | 9/1987 | Grewe et al. |
| 4,766,686 A | 8/1988 | Glasener |
| 4,937,959 A | 7/1990 | Palmer et al. |
| 4,958,458 A | 9/1990 | Hillstrom et al. |
| D351,863 S | 10/1994 | Sarkisian et al. |
| D367,077 S | 2/1996 | Chapman et al. |
| 5,634,538 A | 6/1997 | Tsai |
| D392,686 S | 3/1998 | Sarkisian et al. |
| 5,875,578 A | 3/1999 | Grewe |
| 5,878,518 A | 3/1999 | Grewe |
| 5,881,391 A * | 3/1999 | Mullaney .................. 2/209.13 |
| 6,237,268 B1 | 5/2001 | Levin |
| 6,279,926 B1 | 8/2001 | Taube |
| 6,328,318 B1 | 12/2001 | Hsu |
| 6,565,052 B1 * | 5/2003 | Doublet .................. 248/218.4 |
| D509,543 S | 9/2005 | Hillstrom et al. |
| 6,945,731 B1 * | 9/2005 | Vait ................................ 404/10 |
| 7,302,768 B2 * | 12/2007 | Gajdacs ........................ 40/591 |
| 7,584,563 B2 | 9/2009 | Hillstrom et al. |
| 2005/0076552 A1 * | 4/2005 | Tolna et al. ................ 40/607.03 |

OTHER PUBLICATIONS

International Search Report for International Application No. PCT/US2011/051599 mailed Feb. 13, 2012.

PCT/US2011/51599 Written Opinion, mailed Feb. 13, 2012.

PCT/US2011/51594 Written Opinion, mailed Feb. 16, 2012.

\* cited by examiner

205

210

120

125

205

SIGN ASSEMBLY

BACKGROUND

I. Field

The present application relates to a sign assembly for displaying signage.

II. Description of Related Art

When advertising a product or service, it is common to post a sign in the region where the product is being sold or the service is being offered. For example, a restaurant may place a sign in front of the restaurant announcing specialties. In some instances, the sign includes a base and a panel that are connected via springs. The springs enable the panel to flex in the presence of wind.

However, to secure the springs, a u-shaped metal bracket configured to attach to the bottom of the panel must be attached to the springs. The panel is then attached to the bracket via screws or the like, which increases the complexity of the sign, and also the amount of time and expertise required to assemble the sign.

The sign may include a pair of wheels on a bottom side of the base to enable moving the sign. The wheels may be attached to the base via a common axle. However, the axle is secured to the bottom of the base by snapping the axle into a groove in the bottom of the base or via a bracket configured to hold the axle against the bottom surface of the base. The common axle may flex under the weight of ballast in the base. When this occurs, the bottom side of the base may drag against a surface when being moved.

SUMMARY

In one aspect, a sign assembly includes a base, a pair of spring members, and a panel. The spring members include a resilient portion that includes attachment means at a first end to enable attachment of the spring members to the base. The spring members also include a generally straight rod that extends from a second end of the resilient portion. The panel defines a pair of openings at a lower edge configured to slidably receive the rod of the spring members. The amount by which the rod slides into the panel is configured to secure the panel in an upright position.

In a second aspect, a sign assembly includes a panel and a base. The base is configured to be attached to the panel via a resilient member. The bottom surface of the base defines a pair of cavities. The cavities are positioned substantially adjacent to a forward edge of the bottom surface. A pair of wheel assemblies is secured within respective cavities on the bottom surface. Each wheel assembly includes a housing that houses an axle and wheel.

Other features and advantages will be, or will become, apparent to one with skill in the art upon examination of the following figures and detailed description. It is intended that all such additional features and advantages included within this description be within the scope of the claims, and be protected by the following claims.

BRIEF DESCRIPTION OF THE DRAWINGS

The accompanying drawings are included to provide a further understanding of the claims, are incorporated in, and constitute a part of this specification. The detailed description and illustrated embodiments described serve to explain the principles defined by the claims.

FIG. 1B illustrates a cross-section view of a groove and rod;

DETAILED DESCRIPTION

The exemplary embodiments below describe a sign assembly with a reduced component count. The sign assembly includes a base and panel connected together via a pair of spring members. The spring members attach to the base via fasteners and include rods configured to slidably enter a panel via openings in the bottom of the panel. The rods are interwoven through a group of grooves that enable a tight fit between the panel and the rods.

The sign assembly also includes a pair of wheel assemblies. Each wheel assembly includes a housing that houses an axle and wheel. The wheel assemblies are inserted into cavities defined by the bottom surface of the base while the base is still warm from a forming process. The base then contracts as it cools, forming a tight fit with the wheel assemblies.

Figure 1A:
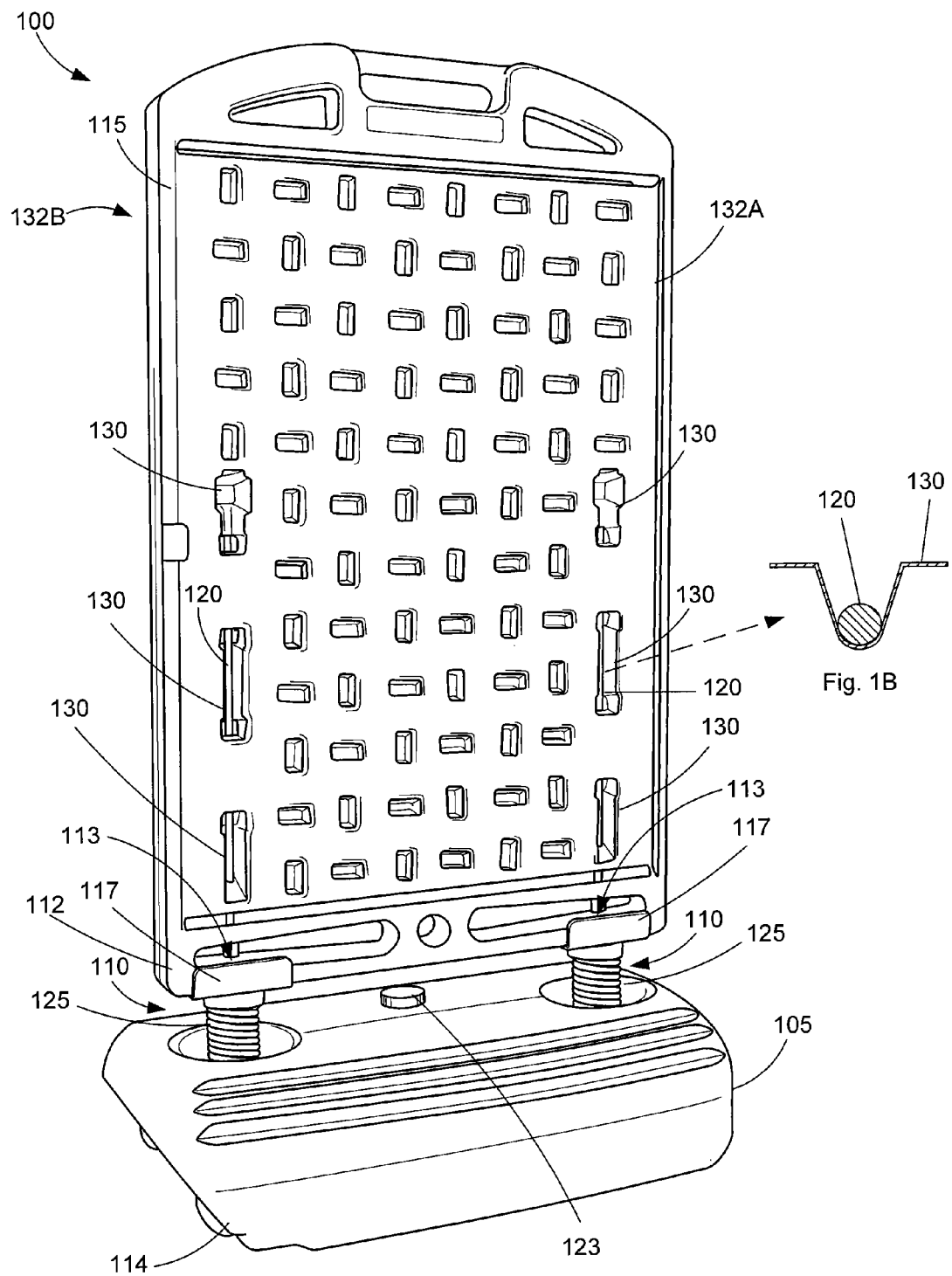
FIG. 1A illustrates a perspective view of a sign assembly.

FIG. 1 illustrates a perspective view of a sign assembly 100. The sign assembly 100 includes a pair of spring members 110, a panel 115, and a base 105. The spring members 110 are utilized to resiliently attach the panel 115 to the base 105. The spring members 110 enable the panel 115 to flex in the presence of wind.

Figures 2A, 2B:
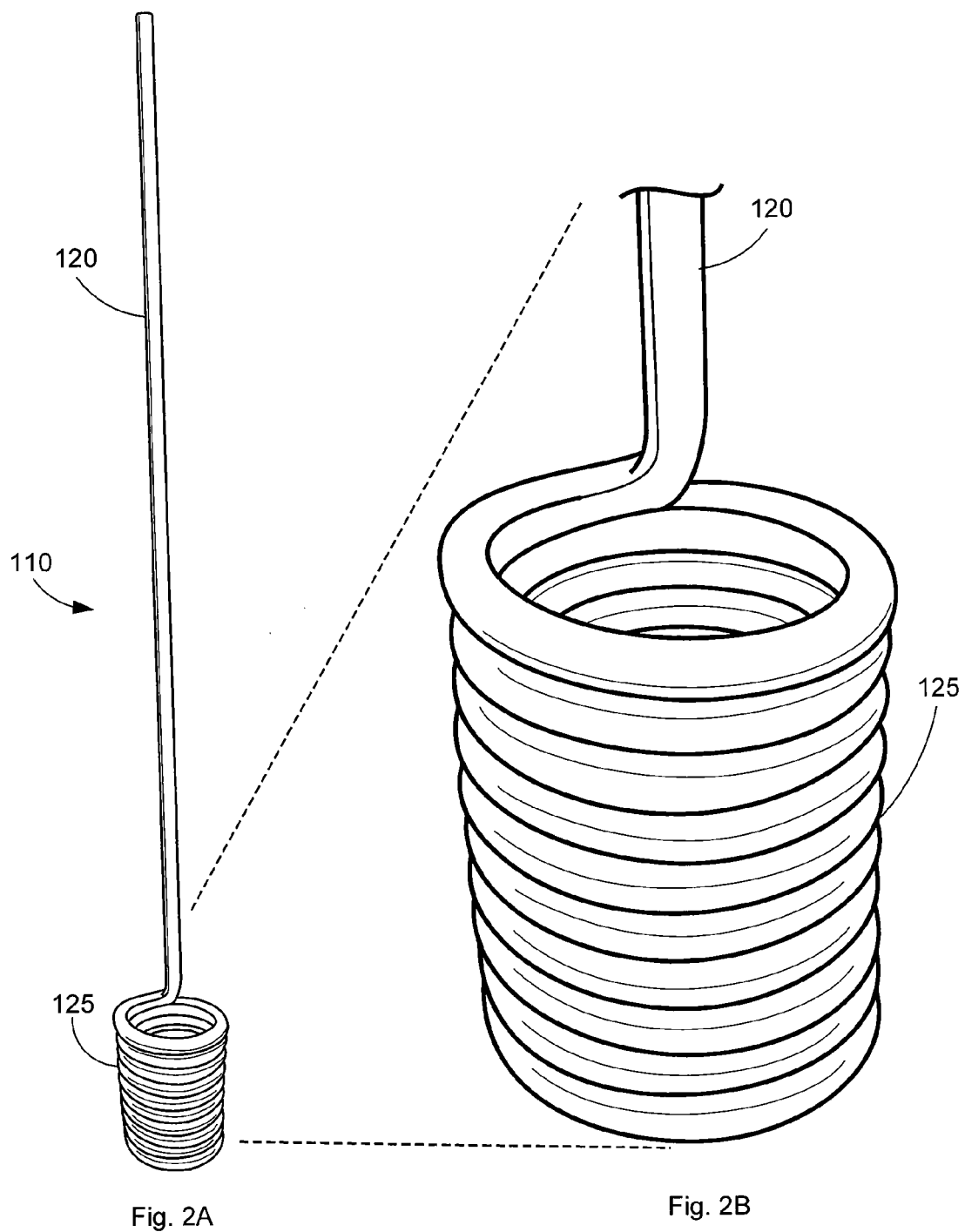
FIGS. 2A-2B illustrate a spring member of the sign assembly.

Referring to FIG. 2A, the spring members 110 include a resilient portion 125 and a generally straight rod 120. The resilient portion 125 may correspond to a coil. The rod 120 may extend from a second end of the resilient portion 125. Referring to FIG. 2B, in some implementations, the resilient portion 125 and the rod 120 are formed from a single continuous piece of material. The material may be a rigid material, such as steel or a other appropriate material as known in the art.

Figure 2C:
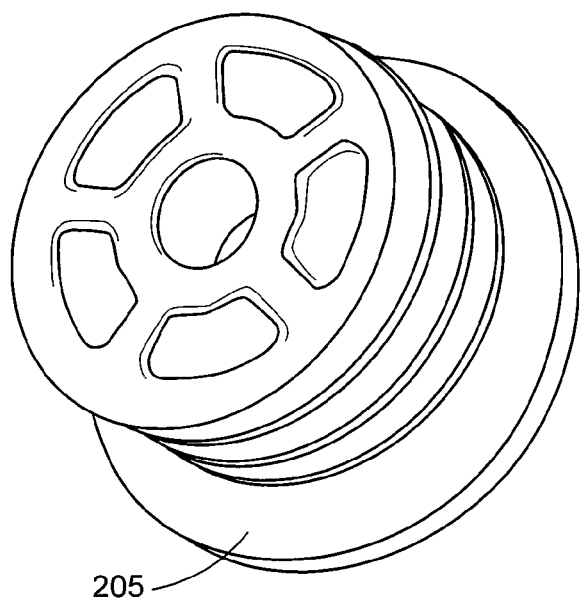
FIGS. 2C-2E illustrate attachment portions for attaching the spring member to a base.
Figure 2D:
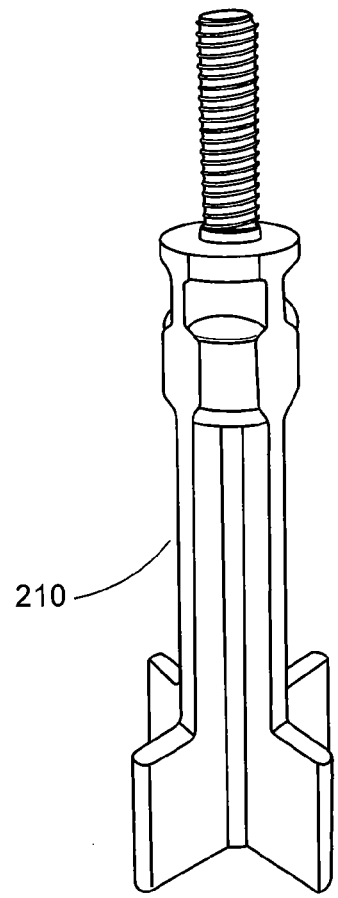
Figure 2E:
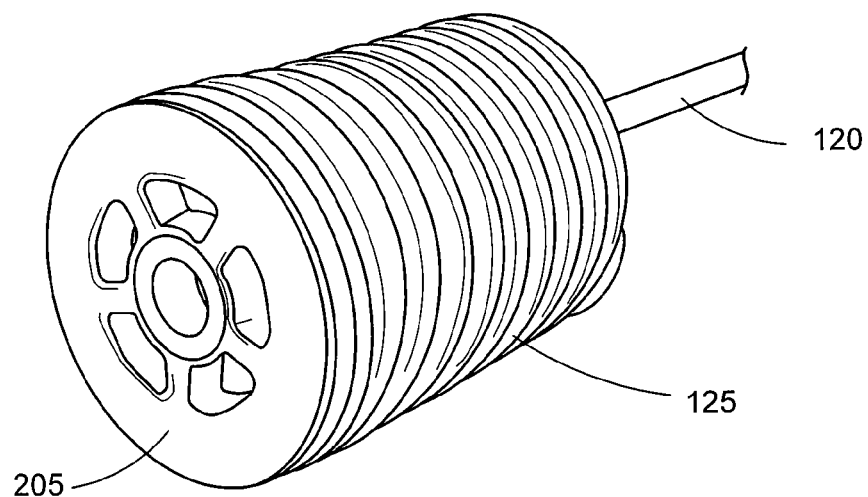

A first end of the resilient portion 125 nearest the base 105 may be configured to attach to the base 105. For example, referring to FIGS. 2C-2E, a threaded insert 205 (FIG. 2C) for receiving a fastener 210 (FIG. 2D), such as a screw, may be positioned into the first end of the resilient portion 125, as shown in FIG. 2E. The spring member 110 may then be attached to a corresponding fastener 210 extending from an underside of the base 105.

Referring back to FIG. 1, the panel 115 may be configured to enable the attachment of signage to a front and/or back surface 132A and 132B of the panel 115. For example, the panel 115 may include attaching means such as those disclosed in U.S. application Ser. No. 12/755,140, filed Apr. 6, 2010, which is hereby incorporated by reference in its entirety.

Figure 3A:
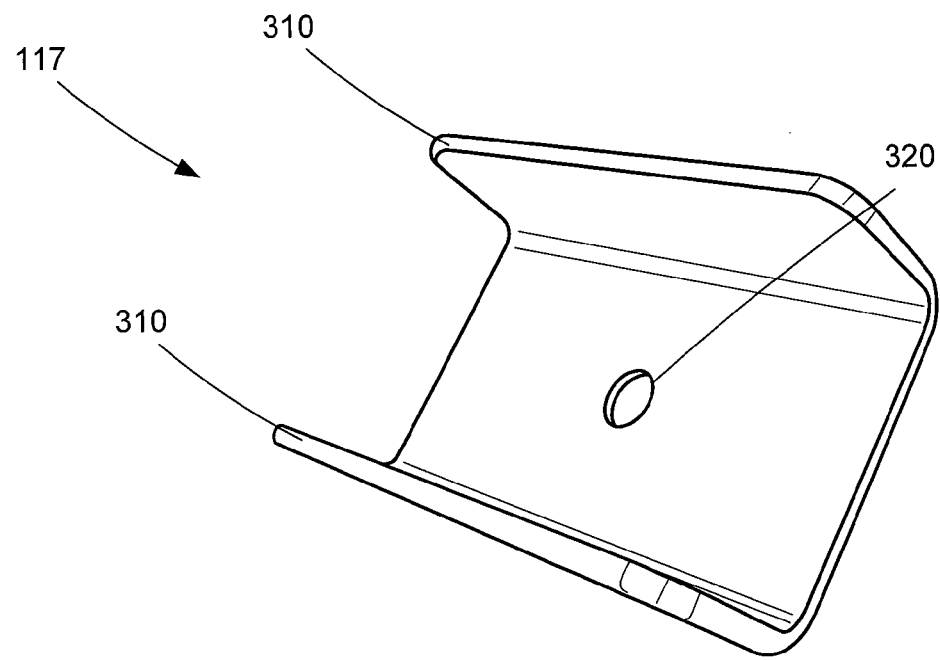
FIGS. 3A and 3B are top and bottom perspective view, respectively, of a spring shaft retainer.
Figure 3B:
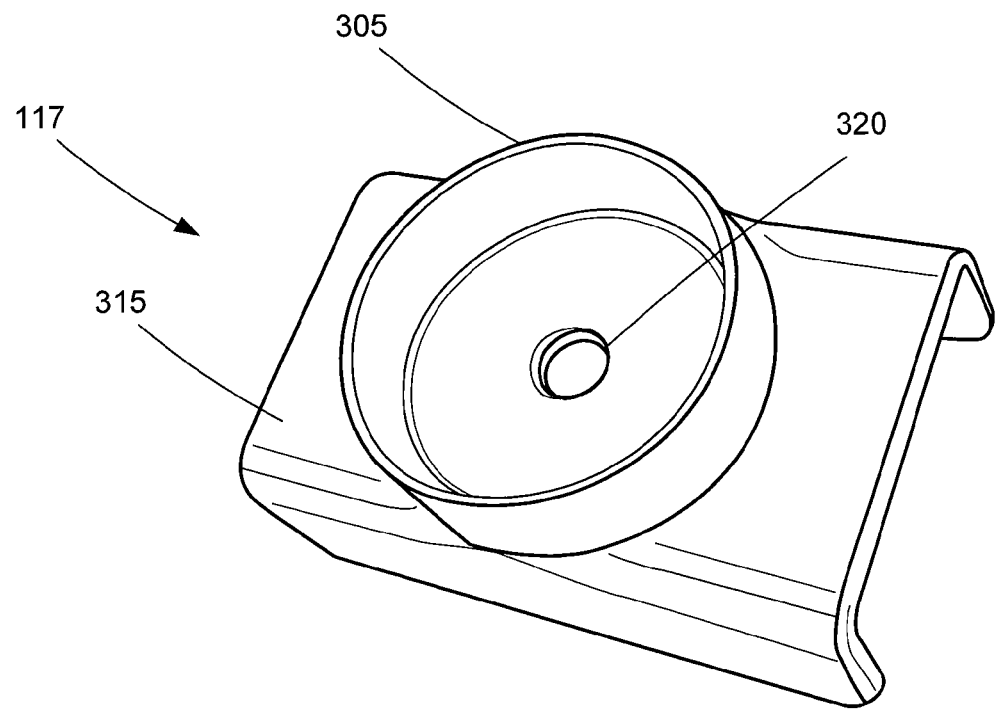

The panel 115 may define a pair of openings 113 at a lower edge 112 sized to enable slidably receiving the rod 120 of the respective spring members 110. A pair of spring shaft retainers 117 may be positioned between the spring members 110 and the panel. Referring to FIGS. 3A and 3B, the spring shaft retainer 117 defines a generally u-shaped upper side configured to be positioned over the lower edge 112 of the panel 115 and a circular portion 305 on a lower side 315 configured to cover the second or top end of the spring member 110. The spring shaft retainer 117 also defines an opening 320 in a center region through which the rod 120 extends. The spring shaft retainer 117 prevents deformation of the openings in the bottom of the panel 115 by providing extra support between the spring members 110 and the panel 115. Without the spring shaft retainers 117, the openings in the bottom of the panel 115 may begin "ovaling" or otherwise deforming when the sign assembly 100 is moved. This problem may be exacerbated when ballast is added to the base 105.

The panel 115 may also define grooves 130 through which the rod 120 extends. The grooves 130 are configured to provide a frictional force against the rod 120 that substantially prevents movement of the panel 115 relative to the rod 120. In some implementations, the grooves 130 define a generally v-shape cross-section configured to wrap around a portion of the rod 120 to increase an amount of friction between the rods 120 and the grooves 130, as illustrated in FIG. 1B. In some implementations, the grooves 130 are defined on both the front surface 132a and the back surface 132B of the panel 115 so that the rod 120 is interwoven through the panel 115 to enable some portions of the rod 120 to be viewed from the front surface 132A and other portions of the rod 120 to be viewed from the back surface 132B.

The length of the rods 120 may be sized to enable securing the panel 115 in an upright position. For example, the rods 120 may extend into the panel by an amount equal to at least one third of the height of the panel 115, or more.

Figure 4:
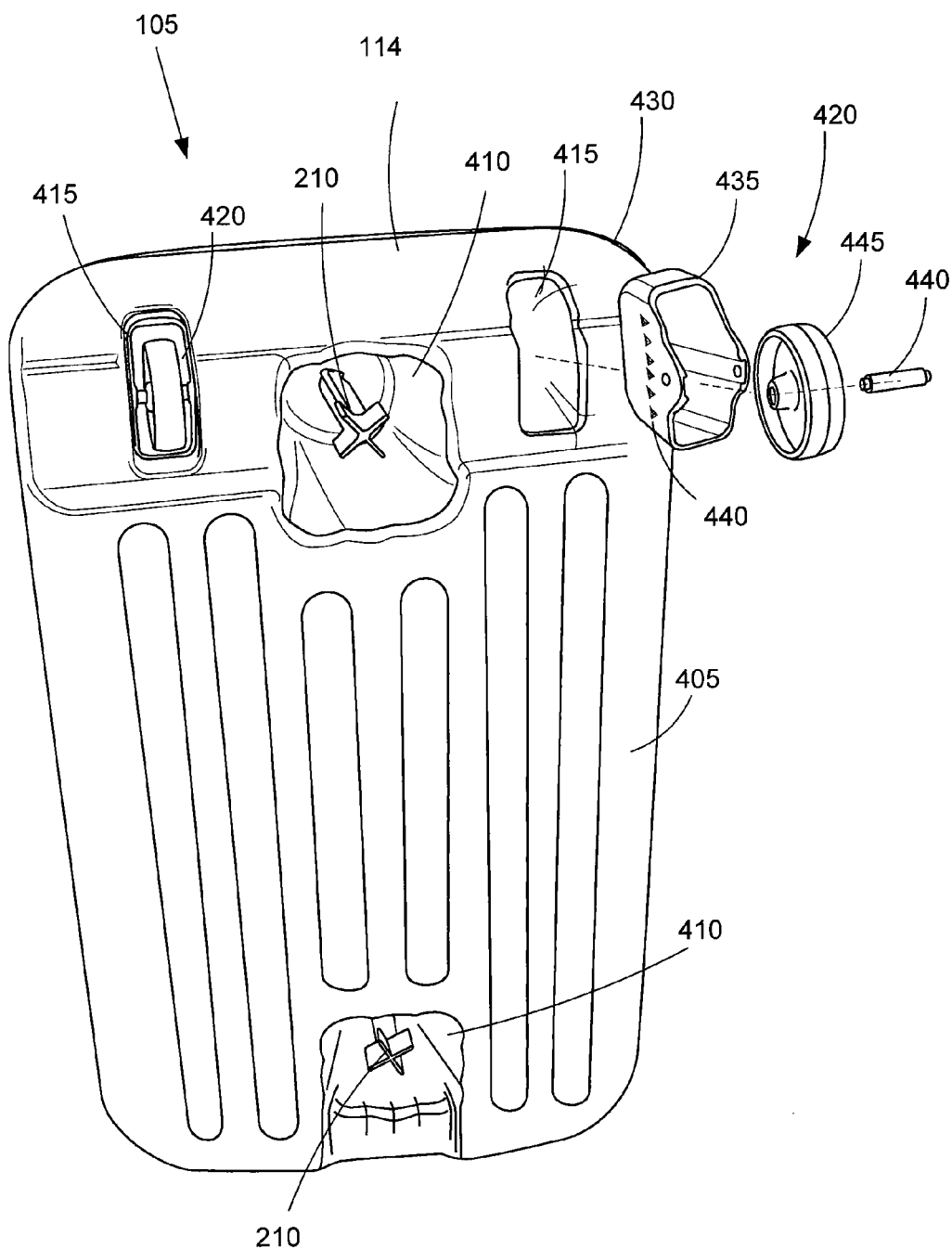
FIG. 4 illustrates a bottom surface of a base of the sign assembly.

The base 105 may be generally hollow and may include an opening 123 for inserting ballast into the base 105 to add weight to the base. Referring to FIG. 4, the bottom surface 405 of the base 105 may define a first group of cavities 410 and a second group of cavities 415. The first group of cavities 410 is configured to receive fasteners 425 that enable attaching the spring members 110 to the base 105. The second group of cavities 415 is positioned substantially adjacent to a forward edge 420 of the base 105 and is configured to receive wheel assemblies 420.

Figure 5A:
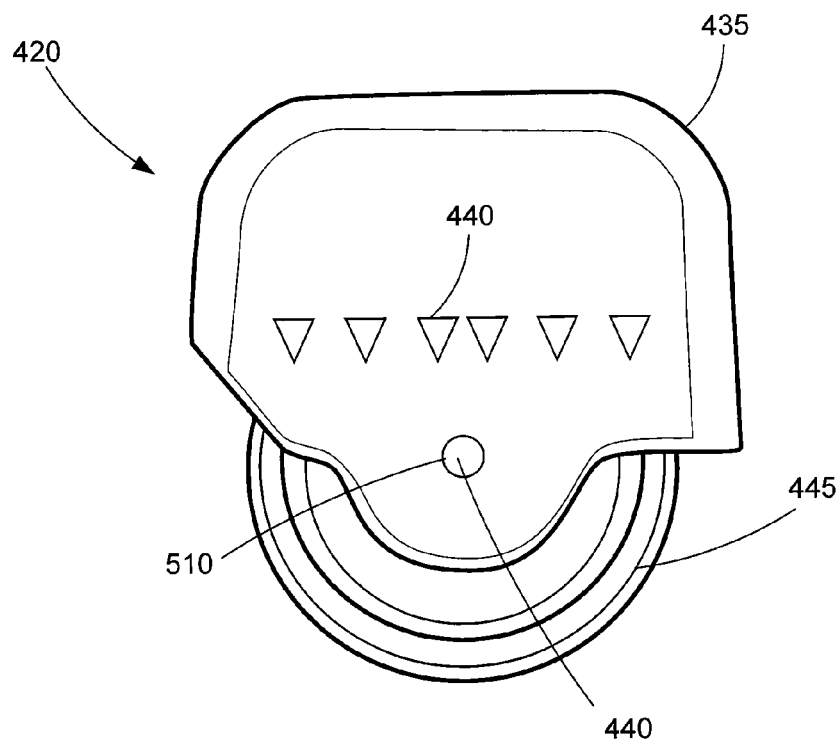
FIG. 5A illustrates a wheel assembly.
Figure 5B:
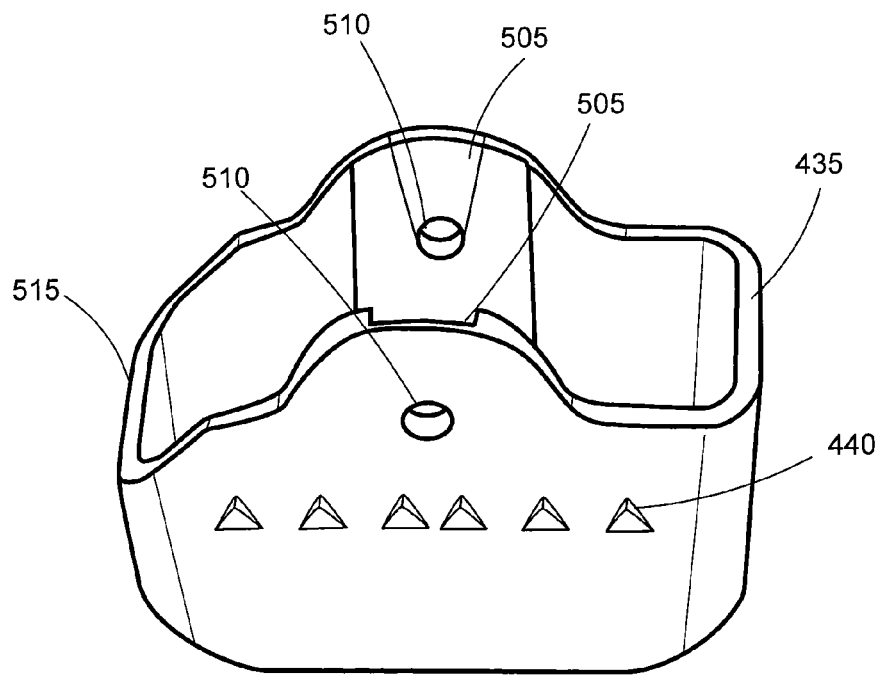
FIG. 5B illustrates a wheel housing.

The wheel assemblies 420 include a housing 435 that houses an axle 440 and a wheel 445. Referring to FIGS. 5A and 5B, an outside surface of the housing 435 defines extensions 440 configured to prevent the housing 435 from being removed from the second group of cavities 415. The extensions 440 may configured as teeth that allow the wheel assemblies 420 to be inserted, but not removed. For example, the extensions 440 may be angled to a point one end. The extensions 440 may be spaced apart in a row along the entire length, from front edge to back edge, of the entire outside surface.

Opposing inner surfaces of the housing 435 define a pair of guides 505 that enable slidably inserting the axle 440 and wheel 445 into the housing until the axle 440 engages a pair of openings 510 that secure the axle 440 in position. In some implementations, a forward edge 515 of the housing 435 is beveled to match a profile 114 of the forward edge 430 of the bottom surface 405 of the base 105.

Figure 6:
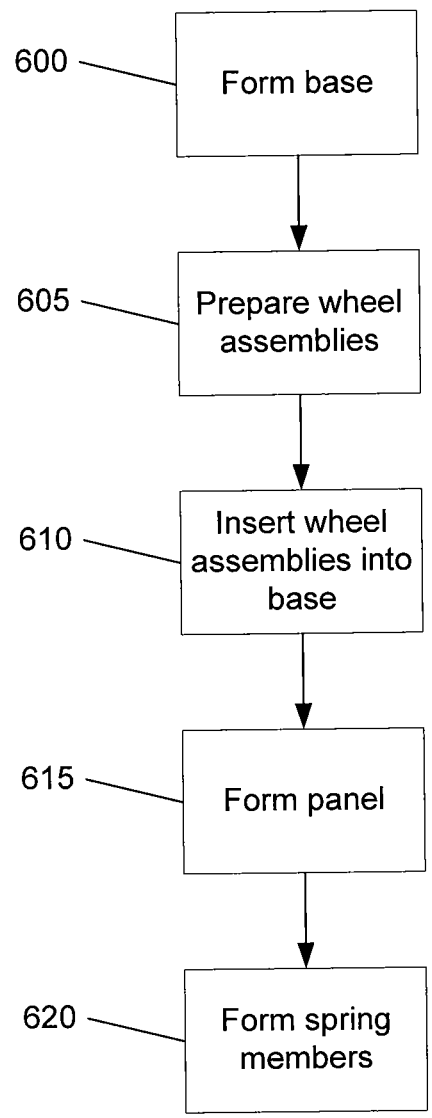
FIG. 6 illustrates an exemplary group of operations for manufacturing components of the sign assembly.

FIG. 6 illustrates a group of exemplary operations for manufacturing the sign assembly 100 of FIG. 1. At block 600, a base may be formed. For example, the base 105 (FIG. 1) described above may be formed via, for example, a blow-molding process or another process known in the art capable of producing a substantially sealed hollow form. The base 105 may be formed to include a first group of cavities 410 though which fasteners 425 are inserted, and a second group of cavities 415 for receiving wheel assemblies 420, as described above.

At block 605, a pair of wheel assemblies 420 such as those described above may be prepared. The preparation of each wheel assembly 420 may include inserting an axle 340 through a wheel 445. Then the axle 440 and wheel 445 may be inserted into a housing 435. The housing 435 may define guides on opposing inner surfaces that enable sliding the axle 440 into the housing 435. The housing 435 may define teeth 440 or other extensions on opposing outer surfaces.

At block 610, the wheel assemblies may be inserted into the base. For example, the wheel assemblies 420 described above may be inserted in the second group of cavities 415 defined in the bottom surface 405 of the base 105. In one implementation, the wheel assemblies 420 are inserted while the base 105 is still hot and somewhat malleable from the forming process at block 600. The base 105 is then allowed to cool and contract around the wheel assemblies 420. When contracting, the teeth 440 may press against and into the inner surfaces of the second group of cavities 415, thus providing a tight fit.

At block 615, a panel may be formed in a similar manner as the base at block 600. For example, the panel 115 described above may be formed via blow molding. The panel 115 may be formed to define a pair of openings 113 in a bottom edge 112 and a group of grooves 130 on front and back surfaces 132A and 132B for receiving a rod 120.

At block 620, the spring members may be formed. For example, the spring members 110 described above may be fabricated from a material, such as steel round stock to form a resilient portion 125 in the form of a coil and a rod 120 that extends from the resilient portion 125.

The various operations shown in FIG. 6 and the order of the operations are merely exemplary. Additional or fewer operations may be performed and/or the operations may be performed in a different sequence.

Figure 7:
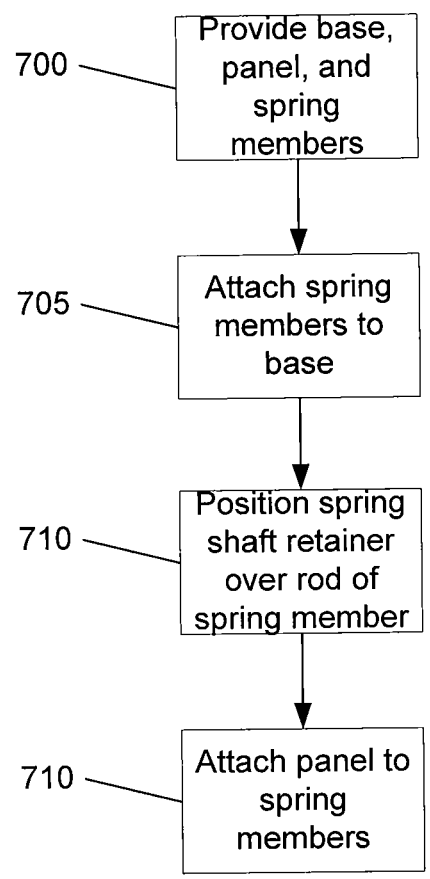
FIG. 7 illustrates an exemplary group of operations for assembling components of the sign assembly.

FIG. 7 illustrates a group of exemplary operations for assembling the sign assembly 100 of FIG. 1. At block 700, a base, panel, and a pair of spring members, such as the base 105, panel 115, and spring members 125 described above, may be provided.

At block 705, the spring members may be attached to the base. For example, a pair of fasteners 210, such as threaded fasteners, may be inserted through the base 305 from a bottom side, through openings defined in a first group of cavities 310. The fasteners 210 may then attach to a first end of a resilient portion 125 of the spring member 110. For example, a threaded fitting 205 for receiving a threaded fastener 210 may be positioned within the first end of the resilient portion 125 of the spring member 110.

At block 708, a spring shaft retainer 117 may be fit over each of the rods 120. The respective spring shaft retainers 117 support the panel 115 and prevent deformation of the openings in the bottom of the panel 115.

At block 710, a panel may be slid over rods of the spring members so as to rest on the spring shaft retainers 117. For example, the rods 120 described above may be inserted through openings 113 defined in the bottom of the panel 115. The panel 115 may then be maneuvered so that the rods 120 pass through grooves 130 defined on the front and back surface 132A and 132B of the panel 115. The grooves 130 may provide a frictional force against the rods 120 that substantially prevents movement of the panel 115 relative to the rods 120. The grooves 130 are positioned to enable viewing the rod 120 as the rod 120 is slid into the panel 115.

The various operations shown in FIG. 7 and the order of the operations are merely exemplary. Additional or fewer operations may be performed and/or the operations may be performed in a different sequence.

While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

We claim:

1. A sign assembly comprising:
   a base;
   at least one spring member, wherein said at least one spring member includes a resilient portion that includes attachment means at a first end to enable attachment of said at least one spring member to said base and a generally straight rod extending from a second end of said resilient portion; and
   a panel that defines a front surface and a back surface, each of which is configured to receive signage, and at least one opening at a lower edge configured to slidably receive said rod of said at least one spring member, wherein an amount by which said rod slides into said panel is configured to secure said panel in an upright position,
   wherein said panel defines at least one groove on the front surface and at least one groove on the back surface through which said rod extends and is interwoven, wherein a trough of both of said grooves defines a generally v-shaped cross-section configured to wrap at least partially around said rod to provide a frictional force against said rod that substantially prevents movement of said panel relative to said rod,
   wherein said at least one groove on said front and said at least one groove on said back surface are open at respective panel surfaces so that of different portions of said rod are visible from both of the front and back surfaces of the panel.

2. The sign assembly according to claim 1, wherein said rod extends into said panel by an amount equal to at least one third of an entire height of said panel.

3. The sign assembly according to claim 1, wherein said resilient portion and said rod are formed from a single piece of material.

4. The sign assembly according to claim 1, wherein said panel defines two openings at said bottom edge for receiving each rod of a pair of spring members, wherein said openings are positioned substantially adjacent to first and second side edges of said panel.

5. The sign assembly according to claim 1, wherein said resilient portion defines a coil.

6. A method for manufacturing a sign assembly:
   providing a base;
   forming at least one spring member that includes a resilient portion with a first end configured to attach to said base and a generally straight rod extending from a second end of said resilient portion;
   forming a panel that defines a front surface and a back surface, each of which is configured to receive signage, and at least one opening at a lower edge configured to slidably receive said rod of said at least one spring member, wherein an amount by which said rod slides into said panel is configured to secure said panel in an upright position; and
   forming at least one groove on the front surface and at least one groove on the back surface of said panel through which said rod extends and is interwoven, wherein a trough of both of said grooves defines a generally v-shaped cross-section configured to wrap at least partially around said rod to provide a frictional force against said rod that substantially prevents movement of said panel relative to said rod,
   wherein said at least one groove on said front and said at least one groove on said back surface are open at respective panel surfaces so that different portions of said rod are visible from both of the front and back surfaces of the panel.

7. The method according to claim 6, wherein said rod extends into said panel by an amount equal to at least one third of an entire height of said panel.

8. The method according to claim 6, further comprising forming said resilient portion and said rod from a single piece of material.

9. The method according to claim 6, further comprising forming two openings at said bottom edge of said panel for receiving each rod of a pair of spring members, wherein said openings are positioned substantially adjacent to first and second side edges of said panel.

10. The method according to claim 6, wherein said resilient portion defines a coil.

* * * * *